US008762582B2

(12) United States Patent
Mori

(10) Patent No.: US 8,762,582 B2
(45) Date of Patent: Jun. 24, 2014

(54) DATA PROCESSING APPARATUS CAPABLE OF COMMUNICATING WITH EXTERNAL DEVICE VIA A PLURALITY OF LOGICAL LINES, DATA PROCESSING SYSTEM, DATA PROCESSING DEVICE STORING DATA PROCESSING PROGRAM, AND DEVICE DRIVER

(75) Inventor: Hiromi Mori, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 263 days.

(21) Appl. No.: 13/233,482

(22) Filed: Sep. 15, 2011

(65) Prior Publication Data
US 2012/0072625 A1  Mar. 22, 2012

(30) Foreign Application Priority Data
Sep. 17, 2010  (JP) ................................. 2010-209768

(51) Int. Cl.
*G06F 3/00* (2006.01)
(52) U.S. Cl.
USPC ................................. 710/5; 710/52; 719/327
(58) Field of Classification Search
None
See application file for complete search history.

(56) References Cited

U.S. PATENT DOCUMENTS 5,832,301 A * 11/1998 Yamaguchi ...................... 710/48
6,333,789 B1   12/2001 Shima
7,216,347 B1 *  5/2007 Harrison et al. .............. 718/103
2003/0222985 A1  12/2003 Goto et al.
2009/0180144 A1   7/2009 Ito
2010/0027041 A1   2/2010 Kanno

FOREIGN PATENT DOCUMENTS

| JP | 11-143655 A | 5/1999 |
|---|---|---|
| JP | 2001-133473 A | 5/2001 |
| JP | 2001-334731 A | 12/2001 |
| JP | 2003-249975 | 9/2003 |
| JP | 2004-013350 | 1/2004 |
| JP | 2009-130850 | 6/2009 |
| JP | 2009-171146 | 7/2009 |
| JP | 2010-039684 | 2/2010 |

OTHER PUBLICATIONS

Notification of Reasons for Refusal in corresponding Japanese Patent Application No. 2010-209768 issued Jan. 8, 2013.

* cited by examiner

*Primary Examiner* — Idriss N Alrobaye
*Assistant Examiner* — Richard B Franklin
(74) *Attorney, Agent, or Firm* — Banner & Witcoff, Ltd.

(57) ABSTRACT

A data processing apparatus includes a data processing unit, a communication unit communicating with an external device via at least two logical lines including a first logical line and a second logical line having priority higher than the first logical line, a storage unit including a first buffer area storing data received by the communication unit via the first logical line and a second buffer area storing data received by the communication unit via the second logical line, and a control unit determining if the second buffer area stores data. According to determination that the second buffer area stores data, the control unit reads data from the second buffer area and controls the data processing unit to process the data read from the second buffer area, and according to determination that the second buffer area stores no data, the control unit determines if the first buffer area stores data.

16 Claims, 14 Drawing Sheets

DATA PROCESSING APPARATUS CAPABLE OF COMMUNICATING WITH EXTERNAL DEVICE VIA A PLURALITY OF LOGICAL LINES, DATA PROCESSING SYSTEM, DATA PROCESSING DEVICE STORING DATA PROCESSING PROGRAM, AND DEVICE DRIVER

CROSS REFERENCE TO RELATED APPLICATION

The present application claims priority from Japanese Patent Application No. 2010-209768, which was filed on Sep. 17, 2010, the disclosure of which is incorporated herein by reference in its entirety.

TECHNICAL FIELD

The present disclosure relates to a processing technique in which data is processed in order of priority.

BACKGROUND

In a data processing apparatus that processes data transmitted from a computer, it is known that the order of processing the data transmitted from the computer can be changed. For example, during transmission of first print data to a printer, when a transmission request of second print data having priority higher than the first print data occurs, the first print data transmission is interrupted and the second print data is transmitted.

SUMMARY

According to an aspect of the present invention, a data processing apparatus includes a data processing unit configured to process data, a communication unit configured to communicate with an external device via at least two logical lines including a first logical line and a second logical line, the second logical line having priority higher than the first logical line, a storage unit including a first buffer area for storing data that is received by the communication unit via the first logical line and a second buffer area for storing data that is received by the communication unit via the second logical line, and a control unit configured to determine if the second buffer area stores data. According to a determination result that the second buffer area stores data, the control unit reads data from the second buffer area and control the data processing unit to process the data read from the second buffer area, and according to a determination result that the second buffer area stores no data, the control unit determines if the first buffer area stores data.

DETAILED DESCRIPTION OF THE ILLUSTRATIVE ASPECTS

Illustrative aspects that will be described below solve following problems that could occur in the related art.

In the communication system of the related art, if the transmission request of high priority data occurs during the data transmission, the data having high priority is processed prior to the data that is being transmitted. If the data transmission is completed when the transmission request of high priority data occurs, the high priority data cannot be processed prior to the data that is completely transmitted.

Data that is received by the data processing apparatus is stored in a queue and the processing order may be changed according to the priority of the data so that the high priority data can be processed prior to other data.

However, complicated processes are required for rearranging the data according to the priority to change the processing order. This increases the load on the data processing apparatus.

<First Illustrative Aspect>

A first illustrative aspect will be hereinafter explained with reference to FIGS. 1 to 8.

(1) Structure of Printing System

Figure 1:
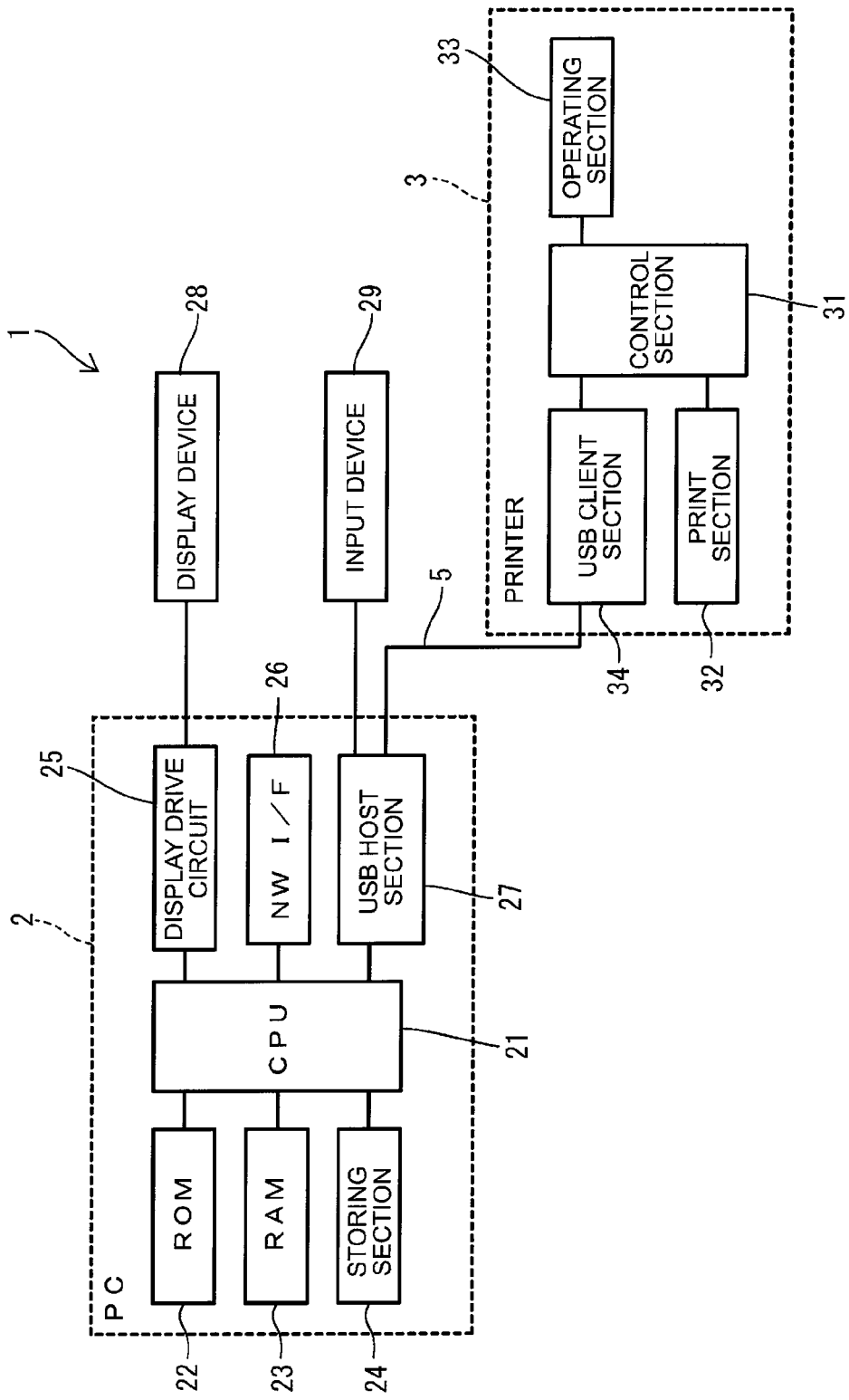
FIG. 1 is a diagram illustrating a configuration of a printing system according to a first illustrative aspect.

A printing system 1 according to a first illustrative aspect will be explained with reference to FIG. 1. The printing system 1 includes a personal computer 2 and a printer 3. The personal computer (PC) 2 and the printer 3 are connected to each other via an USB (Universal Serial Bus) so as to be communicable. The printing system 1 is an example of a data processing system. The personal computer 2 is an example of an external device or an information processing device. The printer 3 is an example of the data processing apparatus.

(1-1) Electrical Configuration of Personal Computer

The PC 2 includes a CPU 21, a ROM 22, a RAM 23, a storing section 24, a display drive circuit 25, a network interface (NW I/F) 26, an USB host section and the like. The display drive circuit 25 is an example of a drive circuit.

The CPU 21 executes various programs stored in the ROM 22 and the storing section 24 and controls each component in the PC 2. The ROM 22 stores various programs that are executed by the CPU 21 and data. The RAM 23 is a main memory that is used when the CPU 21 executes various processes. The CPU 21 is an example of a transmission control unit.

The storing section 24 is a memory for storing various programs and data using a non-volatile storing medium such as a hard drive or a flash memory. The storing section 24 stores an operating system (OS), application programs such as a word processor or spreadsheet (hereinafter referred to as an application), a printer driver, USB protocol stack and the like.

The Microsoft Windows (registered trademark) operating system is used in the first illustrative aspect as an example. The operating system is not limited to the Windows (registered trademark).

The display drive circuit 25 is a circuit that drives a display device 28 such as a CRT and a liquid crystal display and connected to the display device 28 via a cable. The display drive circuit 25 is an example of an assigning module The network interface 26 is connected to an external server via a communication network, such as a wired or wireless LAN and the internet. The above-mentioned programs such as applications or a printer driver may be downloaded off the external server via the network interface 26.

The USB host section 27 includes an USB host controller, a connector (A-type jack) and the like. The USB host section 27 is connected to the printer 3 via the USB cable 5. The USB host section 27 is also connected to an input device 29 such as a mouse and a keyboard. The USB host section 27 is an example of a first communication unit and the input device 29 is an example of the assigning module.

(1-2) Configuration of Printer

The printer 3 is configured as an USB printer class device and includes a control section 31, a printing section, an operating section, a USB client section 34.

The control section 31 includes a CPU, a ROM, a RAM 35 (refer to FIG. 3) and the like. The control section 31 is an example of a processing control unit and may be configured to include a hardware circuit such as an ASIC. The RAM 35 is an example of a storage unit. The CPU executes various programs stored in the ROM to control each section of the printer 3. The ROM stores various programs (for example, control programs or USB protocol stack) that are executed by the CPU and data. The RAM 35 is used as a main memory when the CPU executes various processes.

The RAM 35 is used as a memory that includes a number of reception buffers that temporally store print data that is transmitted from the PC 2. The printer 3 may be configured to include a non-volatile memory such as a hard drive or a flash memory. The non-volatile memory may be configured to include reception buffers. The print data is an example of data. The RAM 35 or a non-volatile memory is an example of the storage unit.

The printing section 32 forms images represented by image data on a recording medium such as a paper in the electrophotographic technology or the ink jet technology. The printing section 32 is an example of a data processing unit.

The operating section 33 includes a display device such as a liquid crystal display, a touch panel that is substantially transparent and covers a display surface of the display device, and various operation buttons. A user operates the operating section 33 to select a function of the printer 3 or make various settings.

The USB client section 34 includes a connector (B-type jack) and a number of FIFO buffers that are called by end points. The USB client section 34 is connected to the PC 2 via the USB cable 5. The USB client section 34 is an example of the communication unit or a second communication unit.

(2) Priority Printing

Figure 2:
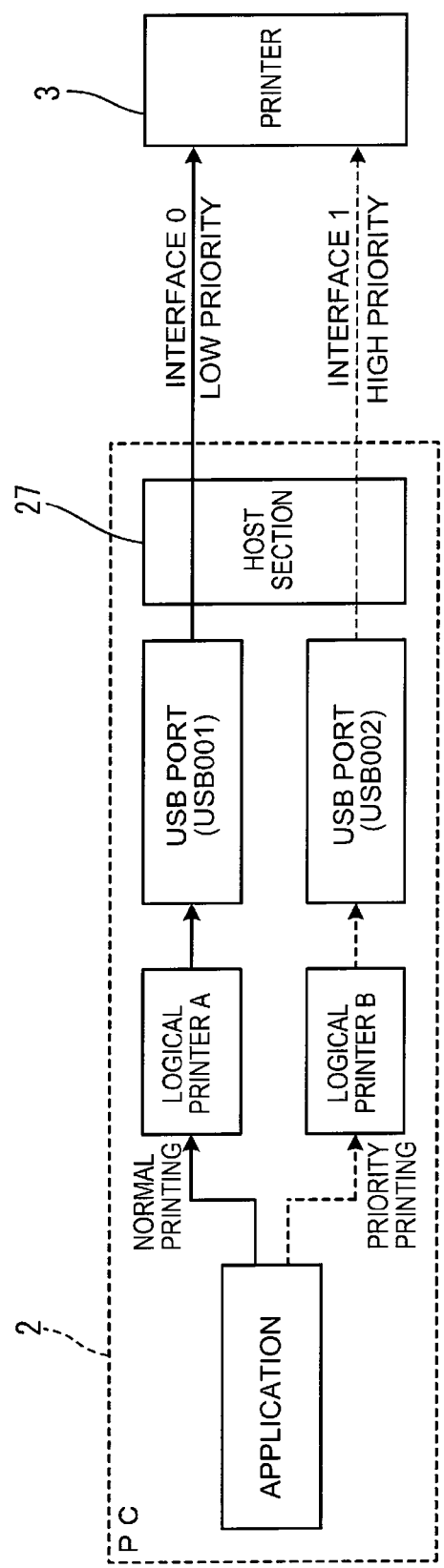
FIG. 2 is a diagram for conceptually explaining priority printing.

Priority printing will be explained with reference to FIG. 2. In the first illustrative aspect, two logical lines (interfaces) are established between the PC 2 and the printer 3 via the USB. A virtual printer (a logical printer) representing the printer 3 is registered in the PC 2 corresponding to each interface. The logical printer will be explained later. A logical communication port (a USB port) is generated for every interface and a different USB port is assigned to each logical printer.

Ordering of priority is assigned to the two interfaces. An interface number is applied to each interface and the priority of the interface becomes higher as the interface number becomes greater. "0" or "1" that is applied to the end of the "interface 0" or "interface 1" designates the interface number.

In case of executing the priority printing, the printer driver transmits print data to the printer 3 via the USB port (USB002) corresponding to the logical printer B that corresponds to the high priority interface. When the priority printing is not executed, that is, when normal printing is executed, the printer driver transmits print data to the printer 3 via the USB port (USB001) corresponding to the logical printer A that corresponds to the low priority interface. Specific explanation will be described below.

(2-1) Interface

The interface (the logical line) will be explained with reference to FIG. 3. The printer 3 that is configured as a USB device may include a number of end points and configures a logical communication channel called as a pipe between the end point and the USB host section 27.

The end point 0 is a specific end point for control transfer and the pipe including the end point 0 allows two-way communication. The pipes including the end points other than the end point 0 enable only one-way communication.

One interface (a logical line) is configured by a reception pipe (IN) and a transmission pipe (OUT). This enables two-way communication such as transmission of print data to the printer 3 and reception of a status from the printer 3 via the interface. The number of pipes included in one interface can be changed.

The printer 3 that is configured as the stores information called by a descriptor that is used to establish a configuration for communication between the USB client section 34 and the USB host section 27 and each interface is configured based on the information. Examples of the descriptor include a device descriptor, a configuration descriptor, an interface descriptor, and end point descriptor and the like.

Two interfaces (interface 0, interface 1) are defined in the descriptor in the printer 3. A configuration is established by using the descriptor to configure two interfaces (two logical lines) between the PC 2 and the printer 3.

(2-2) Logical Printer

If the printer 3 is connected to the USB host section 27 (the host section 27 in FIG. 2) of the PC 2, the printer driver is installed in a Plug and Play manner and the logical printer is registered. In the first illustrative aspect, the Plug and Play action is executed twice in response to the one connecting action of the printer 3 and the PC 2 to configure the two interfaces between the PC 2 and the printer 3.

The processing executed by the first Plug and Play action will be explained. After establishing a configuration as described above, the USB host section 27 acquires a device descriptor from the printer 3 via the interface. The device descriptor includes information identifying the printer 3 (such as a vendor ID, a product ID, a serial number).

An OS specifies the printer 3 based on the acquired device descriptor and generates a USB port that communicates with the printer 3 via the interface (for example, USB001 corresponding to the interface 0). If the USB port is already generated, the next process will be executed.

Next, the OS determines whether the printer driver that controls the printer 3 is installed and if determining that it is not installed, the OS installs the printer driver.

The OS generates a logical printer (logical printer A) based on the installed printer driver. The logical printer is displayed on a setting screen of "printer and fax" in Microsoft Windows.

The OS registers the generated logical printer A in the storing section 24. "Register" means writing information of the logical printer A into system information stored in the storing section 24.

Figure 4:
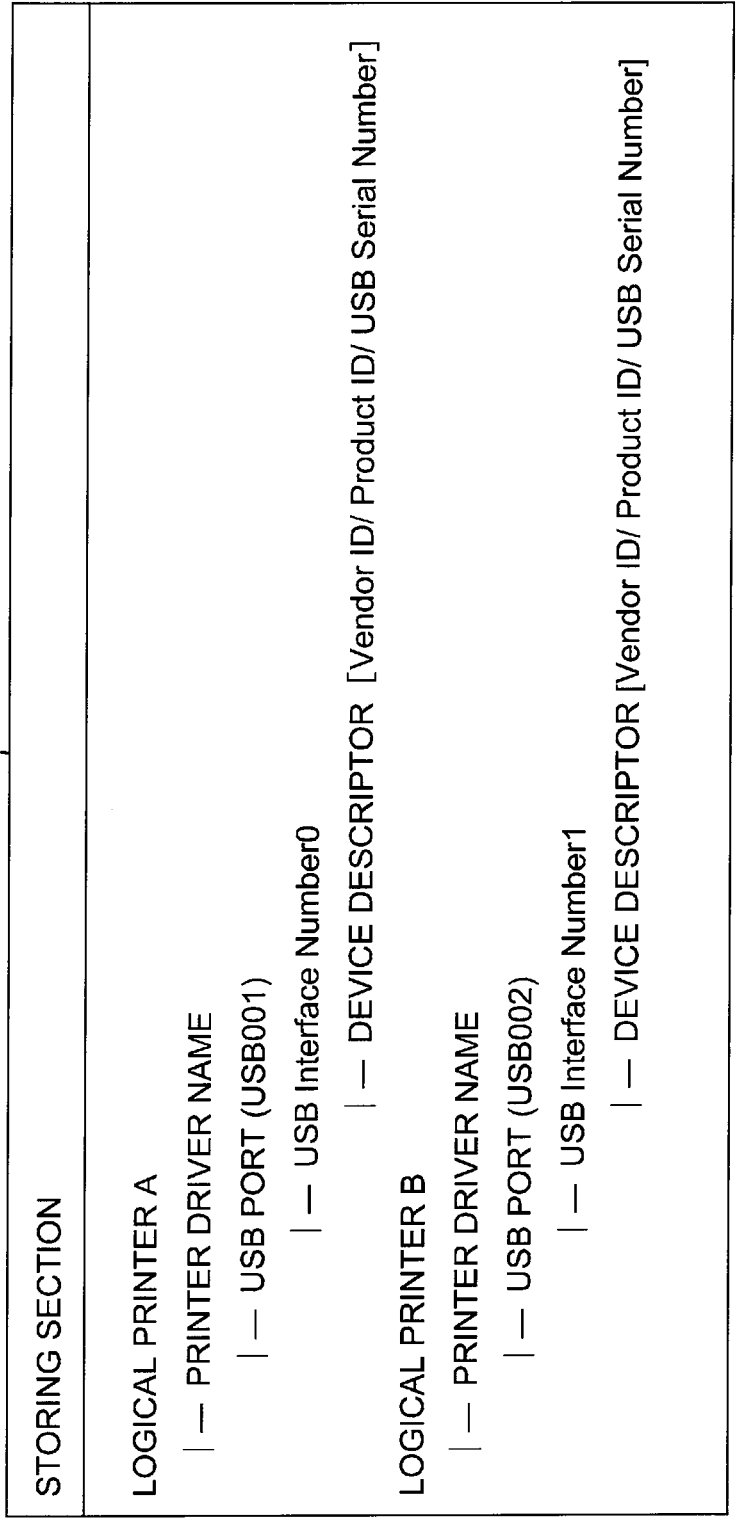
FIG. 4 is a diagram illustrating an example of information of a logical printer.

The logical printer information registered by the OS is illustrated in FIG. 4. As illustrated in FIG. 4, the logical printer information that establishes correspondence between a logical printer name (logical printer A), a driver name of the printer driver, a port name of the generated USB port (USB001), an interface number (0) and a device descriptor.

If the second Plug and Play action is executed, the USB002 corresponding to the interface 1 is generated. Then, the logical printer (logical printer B) is generated and the corresponding logical printer information is registered in the storing section 24. In the second Plug and Play action, the printer driver corresponding to the printer 3 is already installed, and therefore, new printer driver is not installed.

Figure 5:
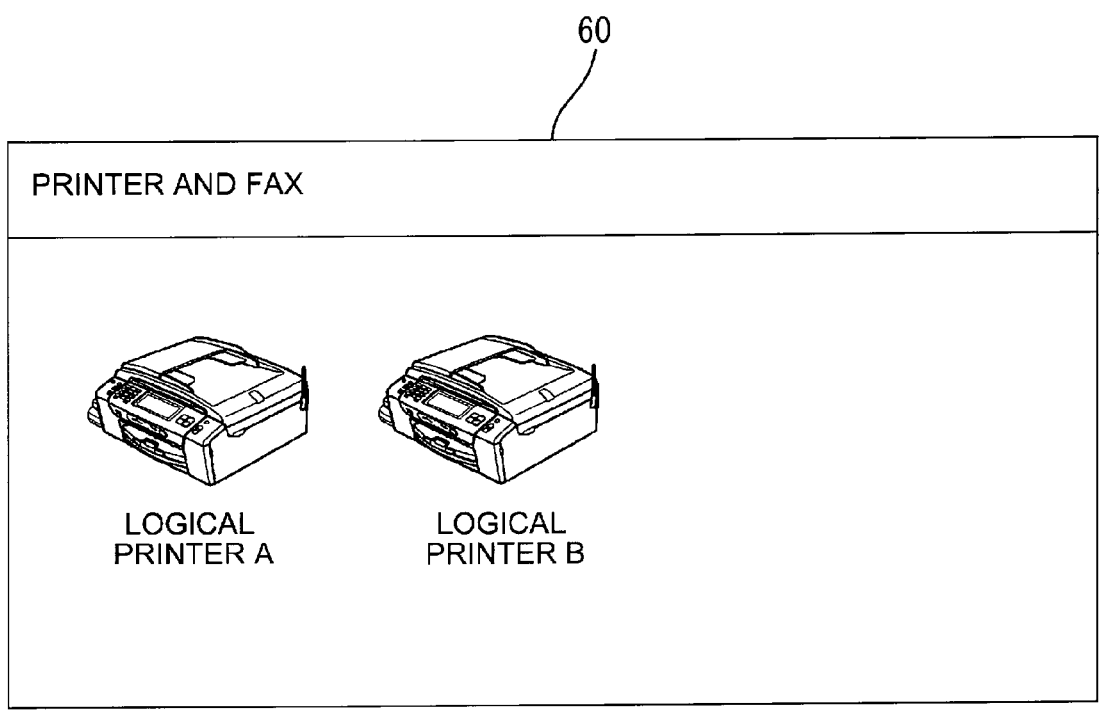
FIG. 5 is a diagram illustrating an example of a setting screen of "printer and fax"

As a result of the above processing, the printer 3 is connected to the USB host section 27. Then, as illustrated in FIG. 5, two logical printers corresponding to the printer 3 are registered by the OS. A screen 60 illustrated in FIG. 5 is an example of a setting screen of "printer and fax".

The logical printer A and the logical printer B correspond to the printer 3, and therefore they have a same printer driver name that controls the printer 3 and a same device descriptor that identifies the printer 3.

(2-3) Driver Information

At the installation of the printer driver in the first illustrative aspect, the driver information in which the driver name of the printer driver is described is stored in the storing section 24. The driver information is included in an installer of the printer driver and distributed to the PC 2.

The driver information is used when the application determines if the printer driver has capability of priority printing.

Any other methods without using the driver information may be used to make the determination as long as the application can determines if the printer driver has capability of priority printing. For example, a user may register the driver name of the printer driver having capability of priority printing in the application, and if the driver name of the printer driver that is to be used for a printing operation is registered in the application, it may be determined that the printer driver has capability of priority printing.

Additionally, the application may inquire the printer driver if it has capability of priority printing, and if receiving a response that the printer driver has capability of priority printing, the application may determine that the printer driver has capability of priority printing.

(2-4) Reception Buffer

Figure 3:
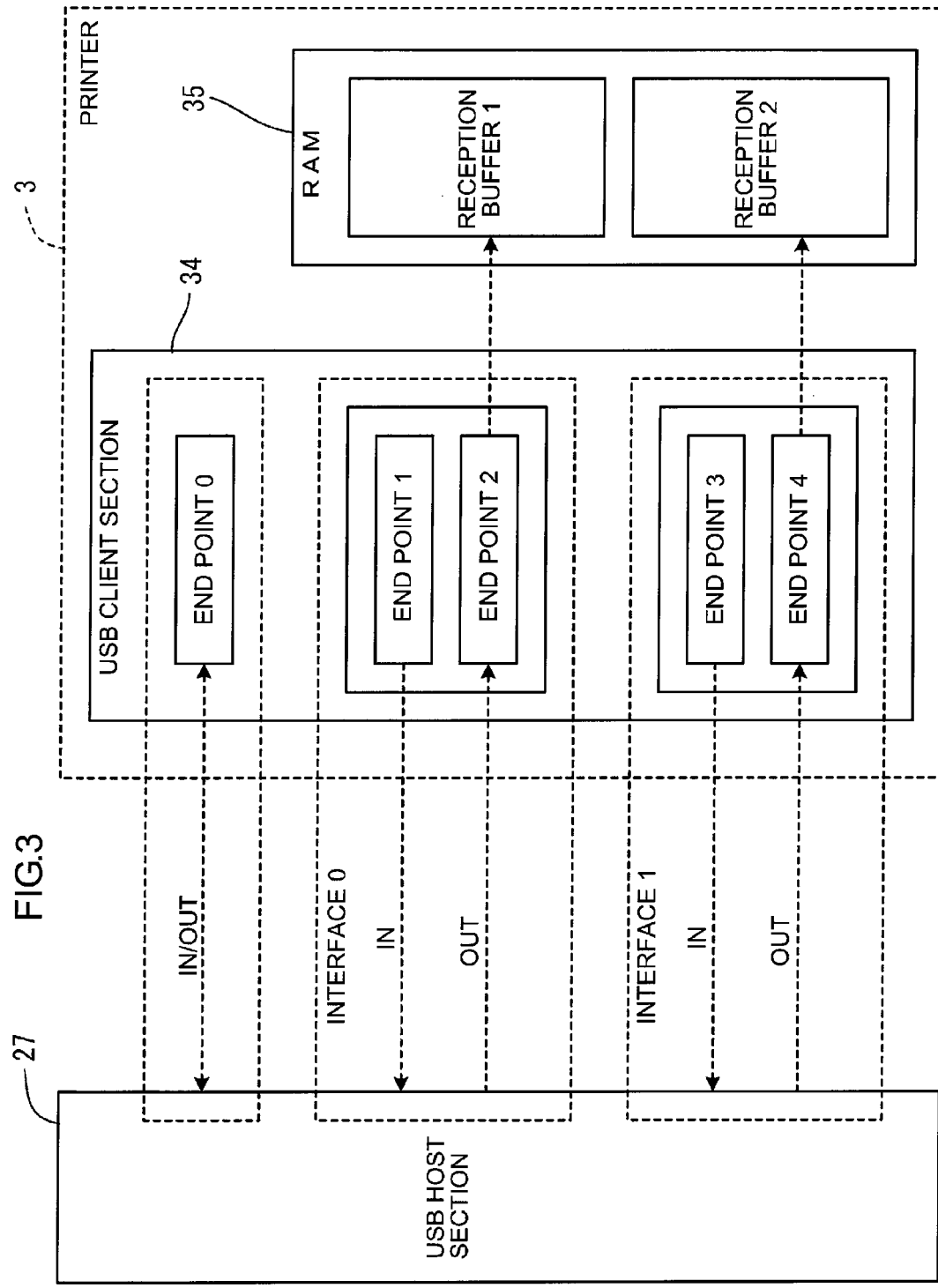
FIG. 3 is a diagram for explaining an interface (logical line)

As illustrated in FIG. 3, reception buffers are allocated in the RAM 35 of the printer 3 for each interface. The reception buffers are allocated in the RAM 35 by the control section 31 if the power of the printer 3 is turned on, for example. The two reception buffers are allocated in one RAM 35 in the first illustrative aspect. Each reception buffer may be allocated in different memory. The reception buffer is an example of a buffer area.

(2-5) Printing Order

The control section 31 repeatedly executes the determination process for determining if print data is stored in each reception buffer. If determining that print data is stored in a reception buffer, the control section 31 controls the print section 32 to print the print data stored in the reception buffer corresponding to the highest priority interface among the interfaces that correspond to the reception buffers in which print data is stored.

Specifically, the control section 31 determines if print data is in (stored in) the reception buffers sequentially in order of priority from the reception buffer 2 corresponding to the highest priority interface. If determining that print data is in one of the reception buffers, the control section 31 controls the print section 32 to print the print data that is first determined to be in the reception buffer.

After completing the printing operation, the control section 31 determines again if print data is in (stored in) the reception buffers sequentially in order of priority from the reception buffer 2 corresponding to the highest priority interface.

For example, a number of print data is stored in the reception buffer 1 corresponding to a low priority interface, and if print data is received and stored in the reception buffer 2 corresponding to a high priority interface while one of the print data stored in the reception buffer 1 is being printed, the following operation will be executed.

After the printing of the print data stored in the reception buffer 1 is completed, the control section 31 determines again if print data is in the reception buffers sequentially in order of priority from the reception buffer 2 corresponding to the highest priority interface. Therefore, a reception buffer that is first determined to have print data is always the reception buffer 2. The print data that is stored in the reception buffer 2 after the print data stored in the reception buffer 1 is printed prior to the print data stored in the reception buffer 1.

The print data stored in the reception buffer is deleted from the reception buffer after it is printed. In the above-described example, after all the print data in the reception buffer 2 is deleted, the print data stored in the print buffer 1 is the one stored in the reception buffer corresponding to the highest priority interface among the interfaces corresponding to the reception buffers in which print data is stored.

(3) Printing Process on PC Side

Figure 6:
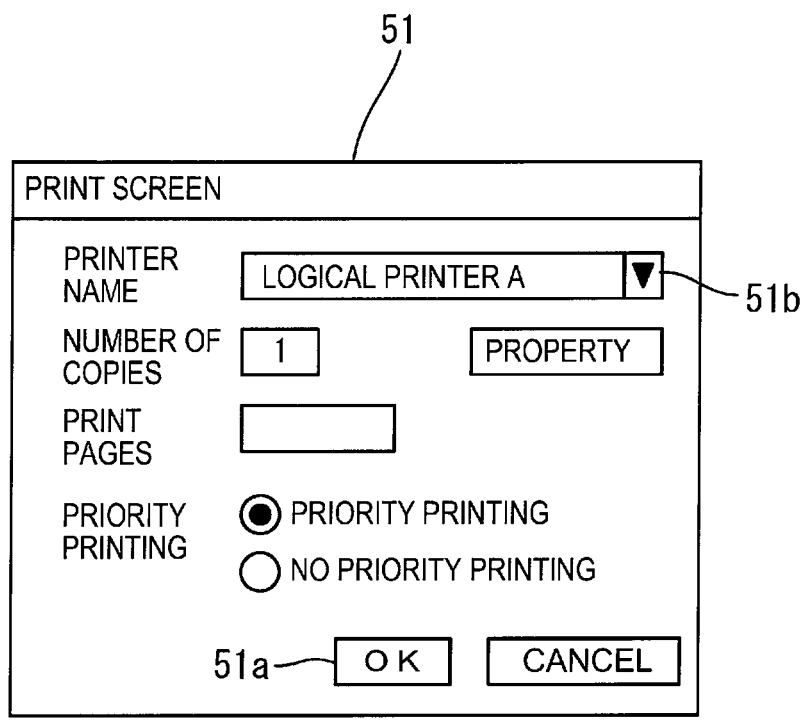
FIG. 6 is a diagram illustrating an example of print screen.

An example of a print screen 51 that is display by an application is illustrated in FIG. 6. If a user selects printing from a menu displayed by the application, the application displays a print screen 51 on the display section. The user can make selection of a logical printer or the priority printing. This selection is an example of an assigning process. The registered logical printers are selectively displayed in a selection box 51b of the logical printer.

In FIG. 6, the logical printer A is selected. In FIG. 6, if "priority printing" is selected, the high priority (1) is selected, and if "no priority printing" is selected, the low priority (2) is selected.

If the user clicks an OK button 51a after making such selections, the application executes a following printing process.

Figure 7:
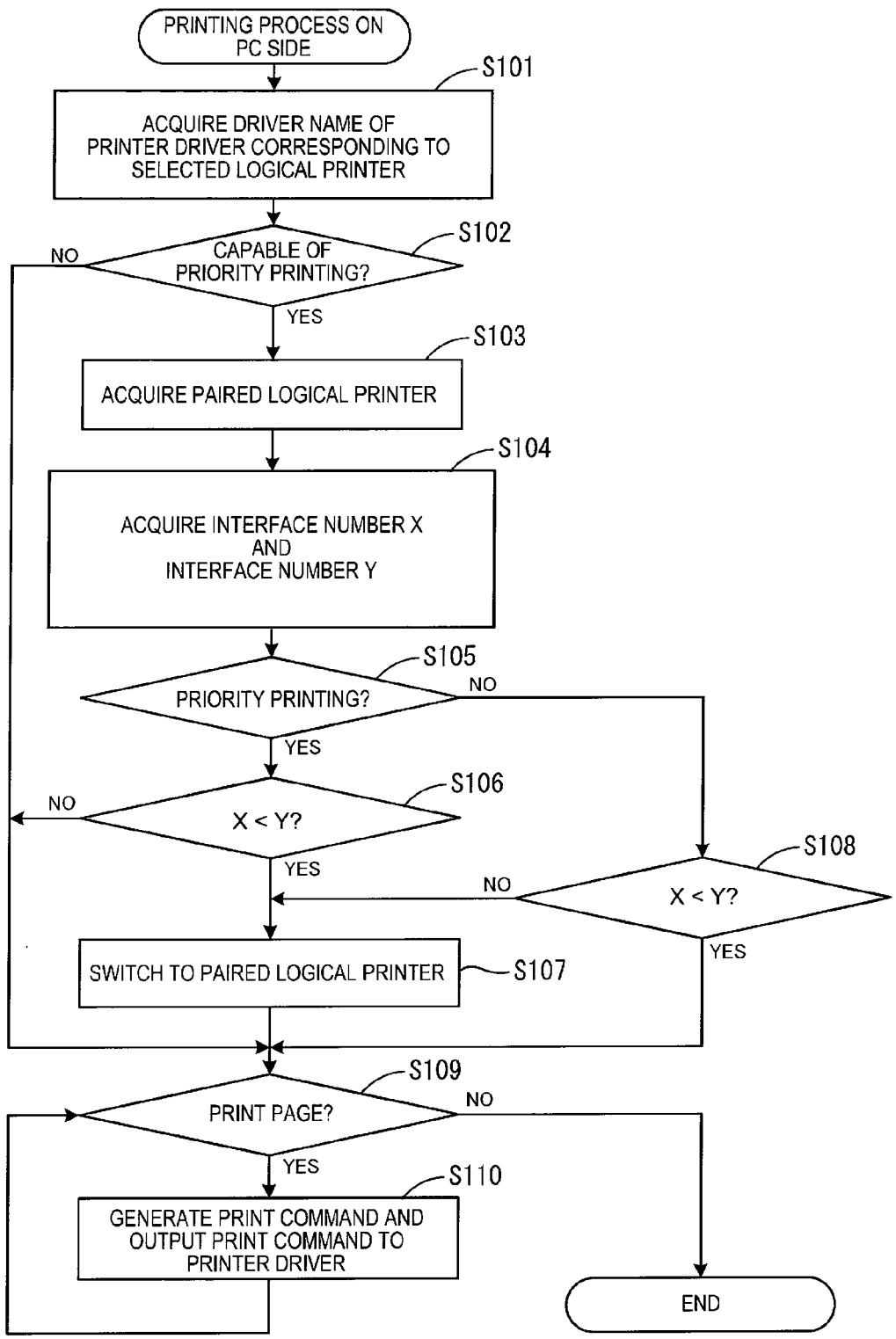
FIG. 7 is a flowchart illustrating a flow of a printing process of a personal computer.

A flowchart illustrating the printing process on the PC 2 side is illustrated in FIG. 7. The printing process on the PC 2 side is executed by the CPU 21 that executes the application (hereinafter, simply referred to as the application).

At step S101, the application acquires a driver name of the printer driver corresponding to the selected logical printer from the logical printer information.

At step S102, the application determines if the printer driver corresponding to the selected logical printer is a printer driver having capability of priority printing.

Specifically, the application determines if the acquired driver name is described in the driver information. If determining that the acquired driver name is described in the driver information, the application determines that the printer driver has capability of priority printing, and if determining that the acquired driver name is not described in the driver information, the application determines that the printer driver has no capability of priority printing.

If the application determines that the printer driver has capability of priority printing, the process proceed to step S103, if the application determines that the printer driver has no capability of priority printing, the process proceeds to step S109.

At step S103, the application acquires from the OS a logical printer that is to be paired with the selected logical printer. Specifically, the application refers to the device descriptor of the logical printer information of the selected logical printer. As described before, a printer that corresponds to the logical printer can be specified by the device descriptor. The application acquires the logical printer information that stores a device descriptor representing a printer same as the specified printer. As described before, the device descriptor of the logical printer A is same as that of the logical printer B. Therefore, if the selected printer is the logical printer A, the logical printer B is acquired as a logical printer that is paired with the logical printer A.

At step S104, the application acquires from the logical printer information an interface number X of the interface corresponding to the selected logical printer and an interface number Y of the interface corresponding to the logical printer that is to be paired with the selected logical printer.

For example, if the selected logical printer is the logical printer A, the interface number X is "0" and the interface number Y is "1". If the selected logical printer is the logical printer B, the interface number X is "1" and the interface number Y is "0".

At step S105, the application determines if the priority printing is selected on the print screen 51. If the priority printing is selected, the process proceeds to step S106 and if the priority printing is not selected, the process proceeds to step S108.

At step S106, the application determines if the interface number Y of the interface corresponding to the logical printer that is to be paired with the selected logical printer is greater than the interface number X of the interface corresponding to the selected logical printer.

In other words, the application determines if the priority of the interface used for communication by the logical printer that is to be paired with the selected logical printer is higher than the priority of the interface used for communication by the selected logical printer.

If the application determines that the interface number Y is greater than the interface number X, the process proceeds to step S107, and if the interface number Y is smaller than the interface number X, the process proceeds to step S109.

At step S107, the application changes the selected logical printer and sets the logical printer that is to be paired with the selected logical printer as the currently selected logical printer. Here, the logical printer that is to be paired with the selected logical printer is the currently selected logical printer.

At step S108, the application determines if the interface number Y of the interface corresponding to the logical printer that is to be paired with the selected logical printer is greater than the interface number X of the interface corresponding to the selected logical printer.

If the application determines that the interface number Y is smaller than the interface number X, the process proceeds to step S107, and if the interface number Y is greater than the interface number X, the process proceeds to step S109.

When the application determines that the priority printing is not executed at step S105, the process of step S108 is executed, and when the application determines that the interface number Y is smaller than the interface number X at step S108, the process proceeds to step S107 to change the selected logical printer and set the logical printer that makes communication via the low priority interface as a currently selected logical printer.

At step S109, the application determines if a print page remains.

One print data may include data of a number of pages that are to be printed on a number of recording members and a print page is referred to as data of one page.

If the application determines that a print page remains, the process proceeds to step S110, and if the application determines that no print page remains, the process is terminated. When the process of step S109 is executed for the first time, a print page should remain. Therefore, the process is to proceed to step S110.

At step S110, the application generates a print command based on the print page and outputs the generated print command and the logical printer information representing the currently selected logical printer to the printer driver corresponding to the currently selected logical printer. This process is an example of an output process. All the logical printer information is not necessarily output to the printer driver but only the information representing the logical printer (or the information representing the logical printer and the information that is to be required for proceeding process of the printer driver) may be output to the printer driver. The print command is an example of a processing command.

The logical printers A and B correspond to the same printer driver, and therefore, the print command and the logical printer information are output to the same printer driver if either one of the logical printers A and B is selected If the priority printing is selected, the logical printer information representing the logical printer B is output as the logical printer information representing the currently selected logical printer. If the priority printing is not selected, the logical printer information representing the logical printer A is output.

The logical printer information is an example of output priority from the application program to the device driver. If a logical printer is uniquely specified, a corresponding interface is uniquely specified, and if an interface is uniquely specified, priority is uniquely determined.

The CPU 21 executes the printer driver that corresponds to the logical printer represented by the logical printer information. The CPU 21 generates print data based on the print command output from the application. This process is an example of a generation process. The CPU 21 also transmits the print data to the printer 3 via the USB port represented by the logical printer information (the USB port corresponding the logical printer). That is, the print data is transmitted to the printer 3 via the interface having the determined priority.

(4) Printing Process on Printer Side

Figure 8:
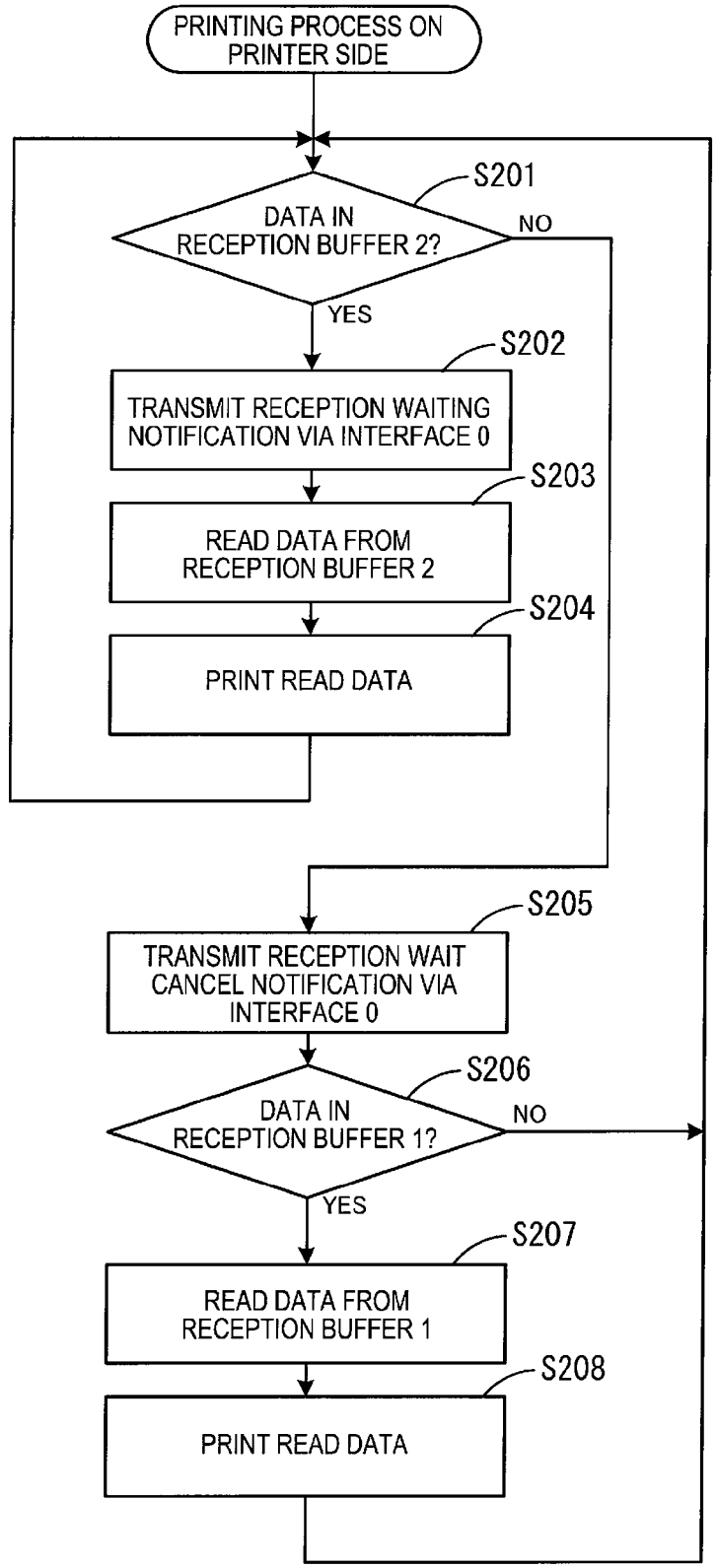
FIG. 8 is a flowchart illustrating a flow of a printing process of a printer.

A printing process on the printer 3 side will be explained with reference to the flowchart illustrated in FIG. 8. This process is repeatedly executed while the power of the printer 3 is on.

At step S201, the control section 31 determines if the reception buffer 2 stores print data. The reception buffer 2 corresponds to the highest priority interface (the interface 1). If the reception buffer 2 stores print data, the process proceeds to step S202, and if the reception buffer 2 stores no print data, the process proceeds to step S205 This process is an example of a determination process.

At step S202, the control section 31 transmits a reception waiting notification to the USB host section 27 via the interface 0. If receiving the reception waiting notification via the interface 0, the USB host section 27 stops transmission of next print data via the interface 0 until receiving a reception waiting cancel notification via the interface 0.

At step S203, the control section 31 reads the print data from the reception buffer 2. Each reception buffer is configured as a FIFO buffer. If the reception buffer 2 stores a number of print data, the control section 31 reads print data that has been most previously stored in the reception buffer 2.

At step S204, the control section 31 controls the print section 32 to print the read print data. After printing, the process returns to step S201 and the control section repeats the following processes.

Because the control section 31 returns to the step S201 after printing, a determination process is not executed until the printing is completed. Therefore, if the print data is being printed by the printing section 32, the determination process is interrupted.

At step 205, the control section 31 transmits the reception waiting cancel notification to the USB host section 27 via the interface 0. If receiving the reception waiting cancel notification via the interface 0, the USB host section 27 restarts the transmission of next print data via the interface 0. The process of step S205 is executed only when the process of step S205 is executed for the first time after the execution of the process of step S202.

At step S206, the control section 31 determines if the reception buffer 1 stores print data. If the reception buffer 1 stores print data, the process proceeds to step S207 and if the reception buffer 1 stores no print data, the process returns to step S201. This process is an example of the determination process.

At step S207, the control section 31 reads print data from the reception buffer 1. If the reception buffer 1 stores a number of print data, the control section 31 reads the print data that has been most previously stored in the print buffer 1.

At step S208, the control section 31 controls the print section 32 to print the print data read at step S207. After printing, the control section 31 returns to step S201 to repeat the following processes. After completing printing, the control section 31 determines again if print data is stored in the reception buffer (the reception buffer 2) corresponding to the most highest priority interface. During the printing operation of step S208, the control section 31 may determine if print data is stored in the reception buffer 2, and if the control section 31 determines that print data is stored in the reception buffer 2, the print data in the reception buffer 2 may be printed after completion of printing of step S208.

(5) Advantageous Effects of First Illustrative Aspect

In the printer 3 according to the first illustrative aspect, if print data has been previously stored in a reception buffer (the reception buffer 1) corresponding to the lower priority interface and print data is transmitted and stored in a reception buffer (the reception buffer 2) corresponding to the higher priority interface, the print data stored in the reception buffer 2 is first to be printed. Print data can be printed in order of priority without requiring complicated processes such as changing the arrangement order of print data according to the priority.

Therefore, with the printer 3, print data can be printed in order of priority with reducing a processing load on the printer 3.

If print data has been previously stored in a buffer area corresponding to the lower priority logical line and print data is transmitted and stored in a buffer area corresponding to the higher priority logical line, the print data stored in the buffer area corresponding to the higher priority logical line is first to be printed. Print data can be printed in order of priority without requiring complicated processes such as changing the arrangement order of print data according to the priority.

Therefore, print data can be printed in order of priority with reducing a processing load on the data processing apparatus.

In the printer 3, while the printing section 32 is printing print data, the process proceeds to a next step after completion of the printing. Therefore, if print data is transmitted and stored in the reception buffer 2 during printing of the print data stored in the reception buffer 1, the print data that is being printed is continued to be printed. After completion of the printing of the print data that is being printed, the print data stored in the reception buffer 2 is printed. In the printer 3, even if print data is transmitted and stored in the reception buffer corresponding to the high priority interface during printing of the print data stored in the reception buffer corresponding to the low priority interface, the printing of the print data that is being printed is not interrupted. This simplifies the control process. Also, since the processing of the data that is being processed is not interrupted, the process of control section is simplified.

Further, in the printer 3, if print data is stored in the reception buffer (the reception buffer 2) corresponding to the high priority interface (the interface 1), next print data transmission via the low priority interface (the interface 0) is waited until all the pint data stored in the reception buffer 2 is completed. Accordingly, the printer 3 does not receive the print data via the low priority interface during printing of the print data stored in the reception buffer (the reception buffer 2) corresponding to the high priority interface. Therefore, the print data received via the high priority interface can be printed promptly. Also, data is not received via a low priority logical line during processing of data stored in a buffer area corresponding to a high priority logical line. Therefore, data received via the high priority logical line can be promptly processed.

<Second Illustrative Aspect>

Figure 9:
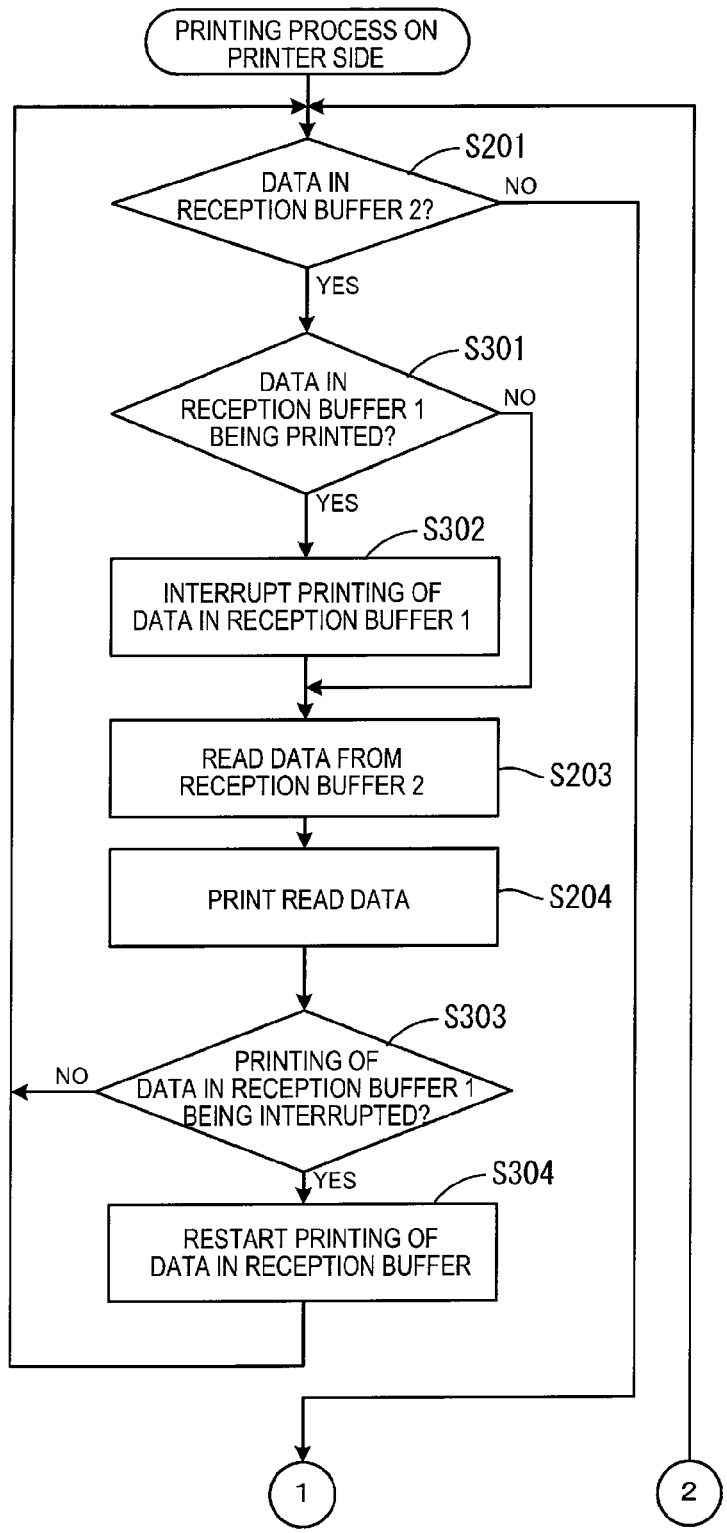
FIG. 9 is a flowchart illustrating a flow of a printing process of a printer according to a second illustrative aspect (first half)
Figure 10:
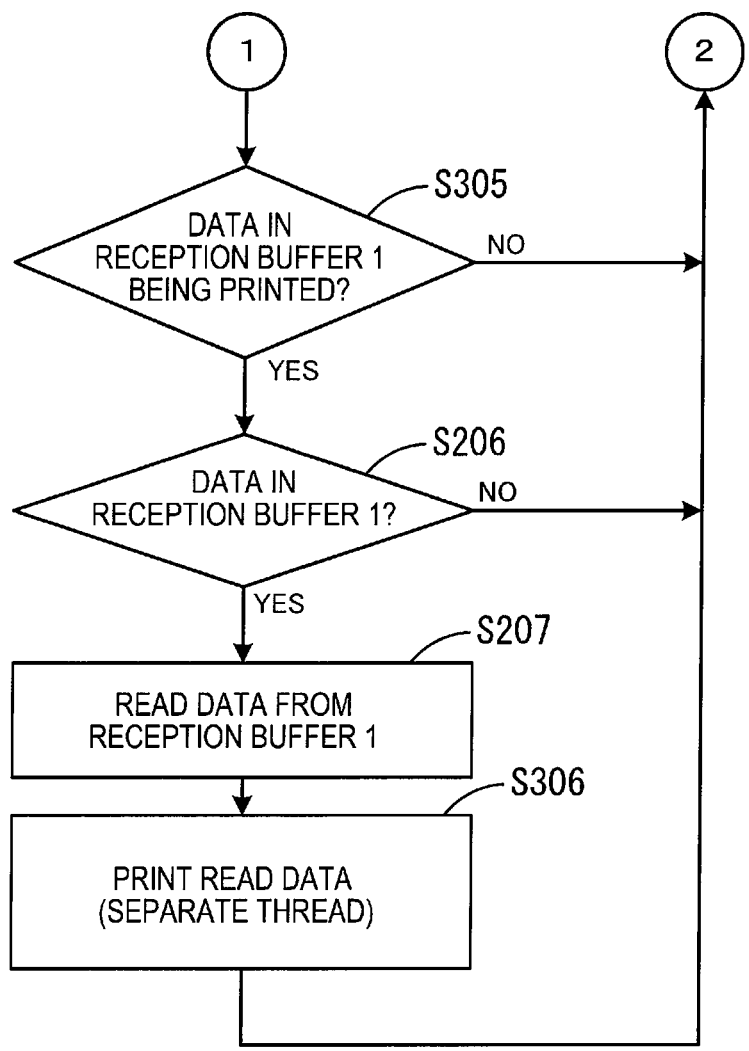
FIG. 10 is a diagram illustrating a flow of the printing process of the printer (second half)

Next, a second illustrative aspect will be explained with reference to FIGS. 9 and 10. In the second illustrative aspect, the printing operation of print data stored in a reception buffer (the reception buffer 1) corresponding to the low priority interface is executed by the print section 32 as a separate thread. The control section 31 also determines if print data is stored in a reception buffer (the reception buffer 2) corresponding to the high priority interface during printing of the print data stored in the reception buffer 1.

If determining that print data is stored in the reception buffer 2, the control section 31 interrupts printing of the print data stored in the reception buffer 1 and the print data stored in the reception buffer 2 is first to be printed.

A flowchart illustrating the print process on the printer side according to the second illustrative aspect will be explained with reference to FIGS. 9 and 10. The process steps substantially same as those in the first illustrative aspect are designated by the same symbols and will not be explained.

At step S301, the control section 31 determines if the print data stored in the reception buffer 1 is being printed. If the print data stored in the reception buffer 1 is being printed, the process proceeds to step S302, and if the print data stored in the reception buffer 1 is not being printed, the process proceeds to step S203.

At step S302, the control section 31 interrupts the printing of the print data stored in the reception buffer 1. The printing may be interrupted after the printing of the print page that is being printed is completed.

At step S303, the control section 31 determines if the printing of the print data stored in the reception buffer 1 has been interrupted. If the print data stored in the reception buffer 1 has been interrupted, the process proceeds to step S304, and if the print data stored in the reception buffer 1 has not been interrupted, the process returns to step S201.

At step S304, the control section 31 restarts printing of the print data stored in the reception buffer 1.

At step S305, the control section 31 determines if the print data stored in the reception buffer 1 is being printed. If the print data stored in the reception buffer 1 is being printed, the process returns to step S201, and if the print data stored in the reception buffer 1 is not being printed, the process proceeds to step S206.

At step S306, the control section 31 controls the print section 32 to print the print data read at step S207. As mentioned before, the control section 31 executes the process of step S306 as a separate thread. Therefore, the control section 31 returns to step S201 without waiting for the completion of the process of step S306. Accordingly, the determination process is executed while print data is being printed by the print section 32.

Other configurations of the printer according to the second illustrative aspect are substantially same as those of the printer according to the first illustrative aspect.

According to the printer of the second illustrative aspect, if the control section 31 determines that print data is stored in the reception buffer (the reception buffer 2) corresponding to the high priority interface, the printing of the print data stored in the reception buffer (the reception buffer 1) corresponding to the low priority interface is interrupted and the print data stored in the reception buffer 2 is first to be printed. Accordingly, print data received via the high priority interface can be promptly printed. Also, since the process of the data that is being processed is interrupted, data that is received via a high priority logical line can be promptly processed.

In the second illustrative aspect, printing of print data stored in the reception buffer (the reception buffer 2) corresponding to the high priority interface is not executed as a separate thread. The determination process is interrupted while the print data stored in the reception buffer is being printed. However, printing of the print data stored in the reception buffer 2 may be executed as a separate thread to execute the determination process while the print data stored in the reception buffer 2 is being printed by the print section 32.

In such a case, a process of determining if the print data stored in the reception buffer 2 is being printed may be executed between steps S201 and S301 and between steps S204 and S303, and if the print data stored in the reception buffer 2 is being printed, the process may be returned to step S201.

<Third Illustrative Aspect>

Figure 11:
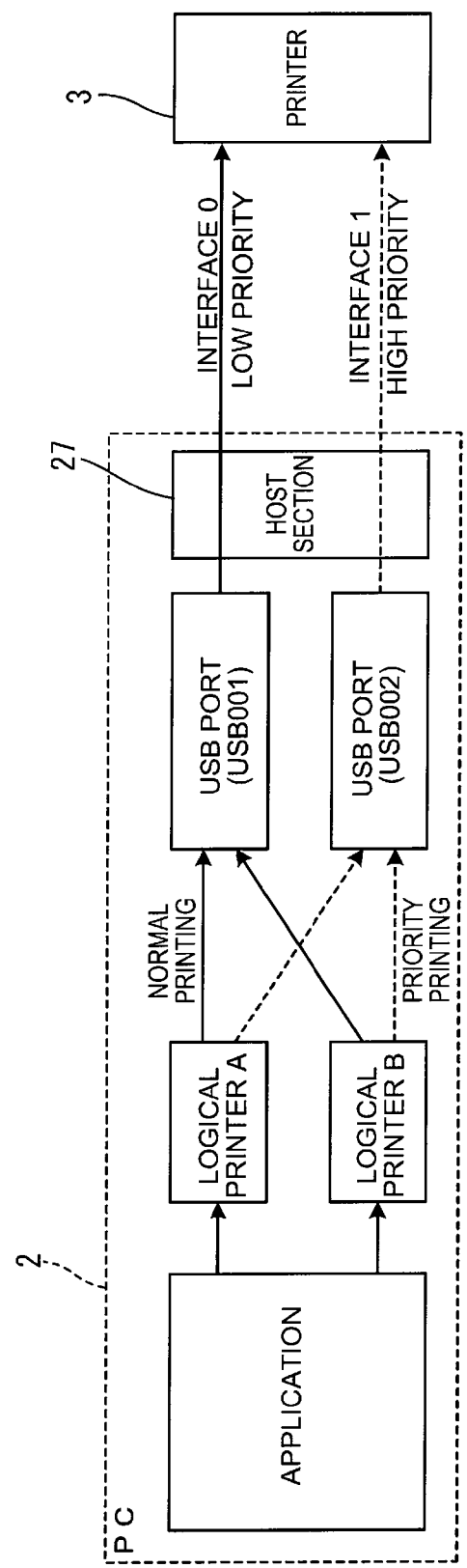
FIG. 11 is a diagram for conceptually explaining priority printing according to a third aspect of the present invention.

A third illustrative aspect will be explained with reference to FIGS. 11 to 13.

In the third illustrative aspect, a user selects whether to execute priority printing from a print condition setting screen displayed by the printer driver. In accordance with the user's selection of execution of the priority printing, the printer driver switches the USB port to switch between priority printing and normal printing.

The priority printing according to the third illustrative aspect will be explained with reference to FIG. 11. In the third illustrative aspect, the application does not let a user to select the execution of priority printing, and the application outputs the print command and the logical printer information representing a logical printer that is selected by the user to the printer driver corresponding to the logical printer selected by the user.

All the logical printer information may not be necessarily output, but only the information representing the logical printer (or the information representing the logical printer and information that is to be required for the following processes of the printer driver) may be output.

If a user selects priority printing and the USB001 corresponds to the logical printer represented by the logical printer information, the printer driver switches the USB port from the USB001 to the USB002 (switching) and transmits print data to the printer 3 via the USB002.

If a user does not select priority printing and the USB002 corresponds to the logical printer represented by the logical printer information, the printer driver switches the USB port from the USB002 to the USB001 (switching) and transmits the print data to the printer 3 via the USB001.

Figure 12:
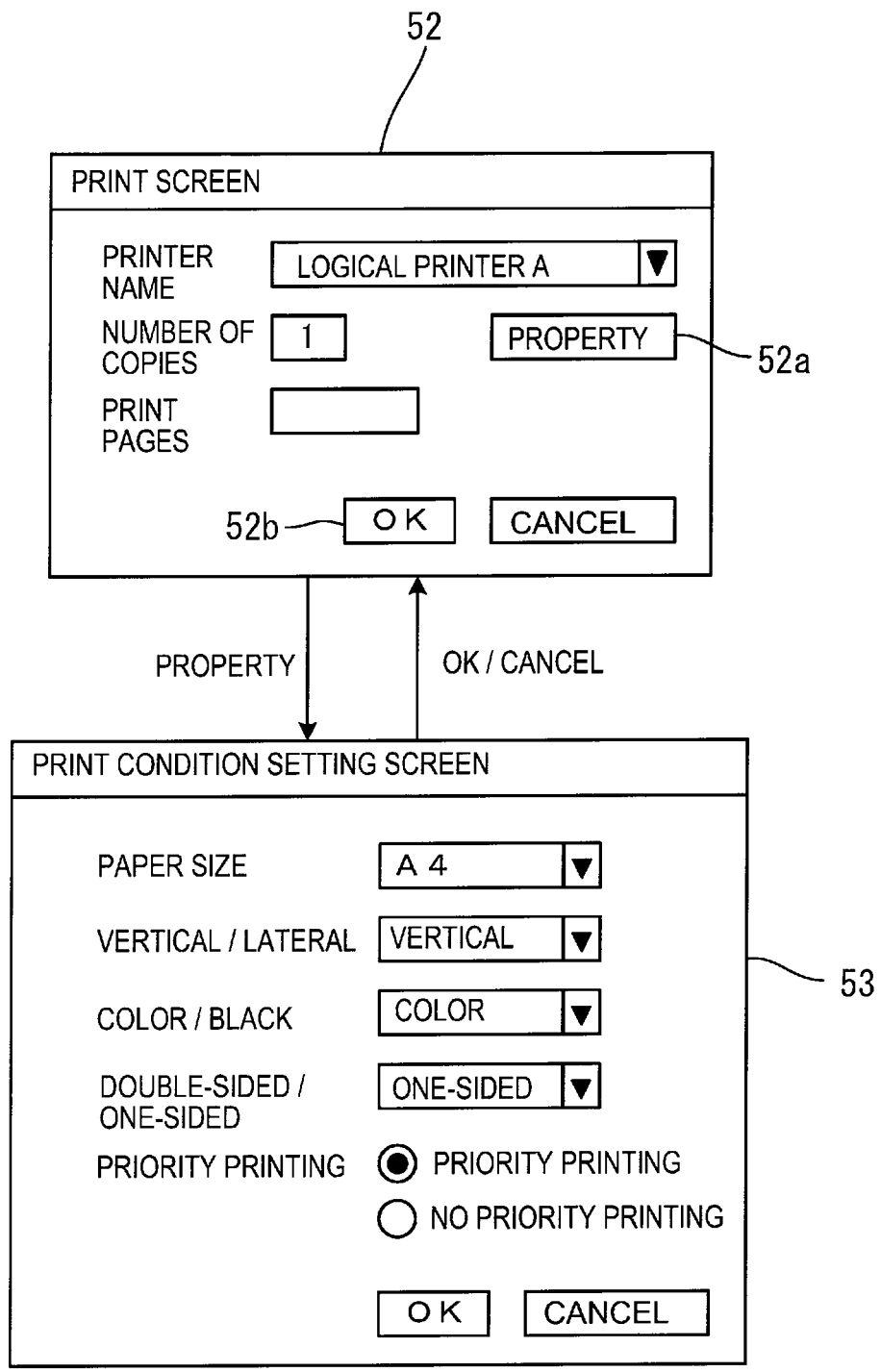
FIG. 12 is a diagram illustrating a print condition setting screen.
Figure 13:
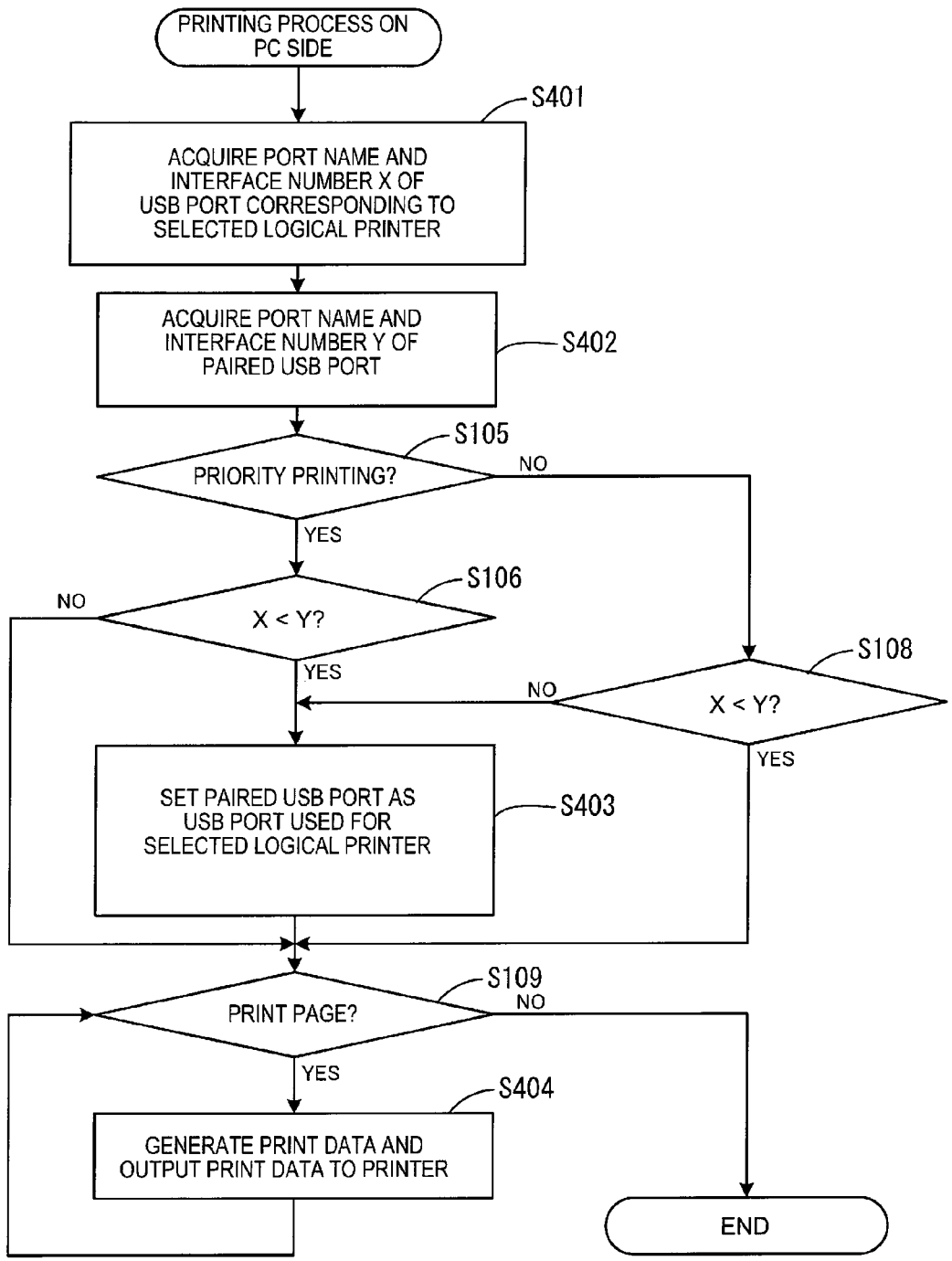
FIG. 13 is a flowchart illustrating a flow of a printing process of a personal computer according to the third illustrative.

A print screen 52 and a print condition setting screen 53 are illustrated in FIG. 12. If a user clicks a property button 52a on a print screen 52 displayed by the application, the printer driver corresponding to the selected logical printer is called.

If the logical printer A is selected and the property button 52a is clicked, the printer driver corresponding to the logical printer A is called and the called printer driver displays the print condition setting screen 53. The same printer driver is called if the logical printer B is selected.

On the print condition setting screen 53, a setting value can be set for every print setting item such as a paper size, vertical/lateral, color./black and the like. As one of the print setting items, priority printing is displayed and a user can select whether to execute priority printing.

If a user closes the print condition setting screen 53 and clicks an OK button 52b, the application outputs to the printer driver the print command and logical printer information representing the logical printer selected by a user.

The printer driver executes a print process that will be explained below in response to the output of the print command.

A flow of the print process on the PC side according to the third illustrative aspect will be explained with reference to FIG. 13. The process steps that are substantially same as those of the first illustrative aspect are designated by the same symbols and will not be explained.

At step S401, the CPU 21 (hereinafter, simply referred to as the printer driver) that executes the printer driver corresponding to the logical printer (the logical printer A) represented by the logical printer information acquires from an OS a port name of an USB port (the USB port that is set as an USB port used by the logical printer A) corresponding to the logical printer A and an interface number X of an interface corresponding to the port name.

At step S402, the printer driver acquires from the OS a port name of an USB port that is to be paired with the USB port set as an USB port used by the logical printer A and an interface number Y corresponding to the port name.

Specifically, the device descriptor is referred to from the logical printer information of the logical printer A. As mentioned before, a printer corresponding to the logical printer A can be specified based on the device descriptor. The application acquires a port name (USB002) corresponding to the logical printer B that stores the device descriptor representing the printer same as the specified printer and the interface number (1).

At step S403, the printer driver requests the OS to set the paired USB port (USB002) as the USB port that is used for the selected logical printer. Thereby, the paired USB002 is set as the USB port that is used for the selected logical printer.

Depending on the OS, if the correspondence between the selected logical printer and the USB port is changed, the logical printer information may be also changed according to the changed correspondence. In such a case, the USB001 may correspond to the logical printer A and also to the logical printer B. This may cause the USB001 to be used although the priority printing is selected. In case of such an OS, the printer driver may copy the logical printer information (the logical printer information illustrated in FIG. 4) and store it in a non-volatile memory. The port name of the paired USB port and the interface number corresponding to the port name may be acquired from the copied logical printer information.

At step S404, the printer driver generates print data and transmits the print data to the printer 3 via the USB port that is set as an USB port used for the selected logical printer.

According to the printer driver of the third illustrative aspect, print data can be printed in order of priority with reducing the processing load of the printer 3.

<Fourth Illustrative Aspect>

Figure 14:
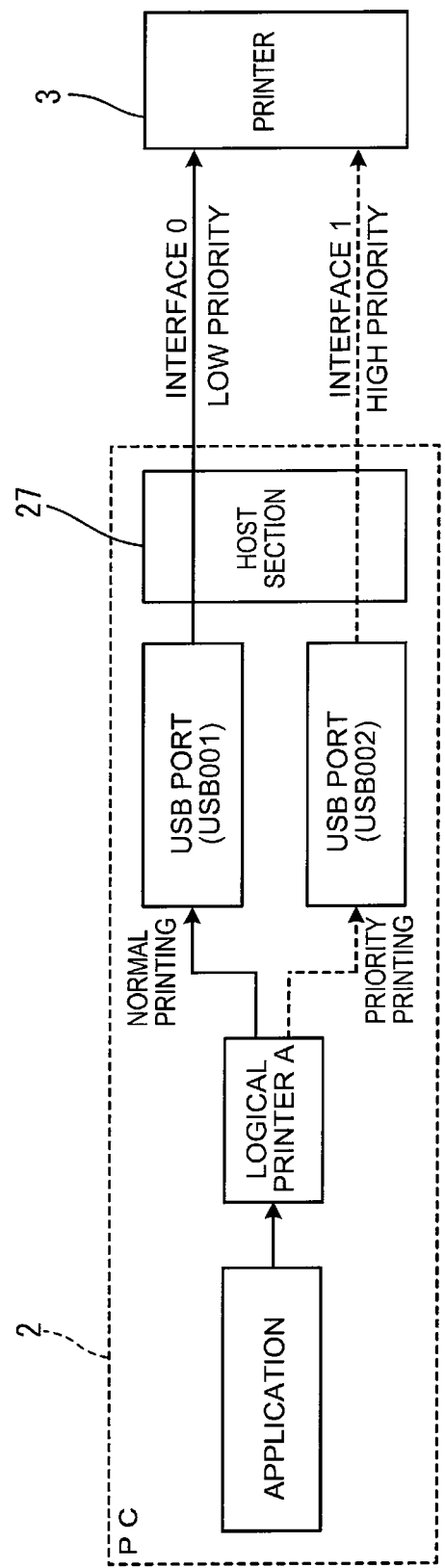
FIG. 14 is a diagram for conceptually explaining priority printing according to a fourth illustrative aspect.

Next, a fourth illustrative aspect will be explained with reference to FIG. 14.

The fourth illustrative aspect is a modification of the third illustrative aspect.

The priority printing according to the fourth illustrative aspect will be explained with reference to FIG. 14. In the third illustrative aspect, the two logical printers (A and B) are registered, however in the fourth illustrative aspect, only one logical printer (a logical printer A in FIG. 14) is registered. Specifically, after two logical printers are registered, the installer executes a process of deleting one of the logical printers.

With the configuration of the fourth illustrative aspect, the logical printer B is not displayed on the print screen 52 displayed by the application. Therefore, a user does not need to select one from a number of logical printers on the print screen 52, and this simplifies a selection operation of a logical printer.

Other configurations of the fourth illustrative aspect are substantially same as the third illustrative aspect.

<Other Illustrative Aspects>

The scope of the present invention is not limited to the illustrative aspects described above with reference to the drawings. The following illustrative aspects may be included in the technical scope of the present invention.

(1) The number of the reception buffers is not necessary to be two but may be changed if necessary.

(2) In the first illustrative aspect, a user selects the priority printing on the print screen 41 displayed by the application. The logical printer A or the logical printer B may be selected in a selection box 51b of the printer to select whether the priority printing is executed or not.

Specifically, if the logical printer A is selected, the printer driver may output a print command to the USB port 001 corresponding to the low priority interface (the interface 0), and if the logical printer B is selected, the printer driver may output a print command to the USB port 0002 corresponding to the high priority interface (the interface 1).

A print command is generally output to the USB port corresponding to the selected logical printer. One of the logical printer A and the logical printer B is selected to determine if the priority printing is executed in this illustrative aspect. Accordingly, a user can select whether to execute the priority printing with a number of generally used applications.

(3) In the first illustrative aspect, the PC 2 executes steps S202 and S205 not to execute next transmission (wait next transmission) of print data via the low priority interface (the interface 0) if print data is stored in the reception buffer (the reception buffer 2) corresponding to the high priority interface (the interface 1). The print data may be transmitted without waiting. If the print data is transmitted without waiting, the reception buffer 1 is full of data and this results in a same effects as the case in which the next transmission of print data is waited.

In this illustrative aspect, if the print data is waited, more reliable effect can be obtained.

(4) The data is not limited to print data.

The data may be print data and an inquiry command that inquires the printer of a status. If a real-time status of the printer is to be inquired and the inquiry command is processed after completion of printing of print data stored in the reception buffer, waiting time occurs for acquiring the status. In such a case, the print data is transmitted via the low priority interface, and the inquiry command is transmitted via the high priority interface. The real-time status of the printer is acquired even if the print data has been already transmitted to the printer.

A command that is transmitted via the high priority interface is not limited to the inquiry command. Any commands that are preferable to be processed prior to the print data can be transmitted.

(5) The data processing apparatus is not limited to a printer. The data processing apparatus may be a facsimile device that transmits to an external facsimile device facsimile (fax) data transmitted from the PC. In such a case, facsimile data stored in the reception buffer corresponding to the high priority interface is transmitted prior to the facsimile data stored in the reception buffer corresponding to the low priority interface. This suppresses increasing of a processing load on the facsimile apparatus and the facsimile data is transmitted in order of priority.

The data processing apparatus may execute some processing (such as image processing) to data or register data on data base.

(6) In the above illustrative aspects, a user specifies whether to execute priority printing. If a predetermined print setting is made, the priority printing may be automatically executed.

(7) The communication standard is not limited to USB. Communication may be made via a TCP/IP network or via other communication lines by dividing one physical line into a number of logical lines with a time-division multiplex method.

The function of each section included in the apparatus is achieved by hardware resources with which the function is specified by a configuration, hardware resources with which the function is specified by a program, or combination thereof. The function of each section is not necessarily achieved with a hardware resource that is physically independent from other hardware resources.

What is claimed is:

1. A data processing apparatus comprising:
a data processing unit configured to process data;
a communication unit configured to communicate with an external device via at least two logical lines including a first logical line and a second logical line, the second logical line having a higher priority than the first logical line;
a storage unit including a first buffer area for storing data that is received by the communication unit via the first logical line and a second buffer area for storing data that is received by the communication unit via the second logical line; and
a control unit configured to:
determine whether the second buffer area stores data;
read data from the second buffer area, control the data processing unit to process the data read from the second buffer area, and transmit a reception waiting notification to the external device via the first logical line, in response to a determination result indicating that the second buffer area stores data;

transmit a reception waiting cancel notification to the external device via the first logical line on completion of the processing of the data stored in the second buffer area; and determine whether the first buffer area stores data, in response to a determination result indicating that the second buffer does not store data.

2. The data processing apparatus according to claim 1, wherein the control unit is further configured to control the data processing unit to process the data read from the first buffer area, in response to a determination result indicating that the first area stores data.

3. The data processing apparatus according to claim 2, wherein the control unit is further configured to:

determine whether the processing of the data read from the first buffer area is completed; and control the data processing unit to process the data read from the second buffer area, in response to a determination result indicating that the processing of the data read from the first buffer area is completed and the second buffer area stores data.

4. The data processing apparatus according to claim 2, wherein the control unit is further configured to:

determine whether the data processing unit is processing data read from the first buffer area;

interrupt the processing of the data read from the first buffer area, and control the data processing unit to process the data read from the second buffer area, in response to a determination result indicating that the second buffer area stores data and the data processing unit is processing data read from the first buffer area; and restart the interrupted processing after completion of the processing of the data read from the second buffer area.

5. A data processing system, comprising:

a data processing apparatus; and an information processing apparatus in communication with the data processing apparatus via at least two logical lines, the information processing apparatus including:

a first communication unit configured to communicate with the data processing apparatus via the at least two logical lines including a first logical line and a second logical line, the second logical line having a higher priority than the first logical line;

an input device configured to input a selection of one of a first priority and a second priority, which is higher than the first priority, that is to be assigned to data that is to be processed by the data processing apparatus; and a transmission control unit configured to control the first communication unit to transmit data having the first priority via the first logical line and transmit data having the second priority via the second logical line, and the data processing apparatus including:

a data processing unit configured to process data;

a second communication unit configured to communicate with the information processing apparatus via the at least two logical lines;

a storage unit including a first buffer area and a second buffer area, the first buffer area for storing the data having the first priority that is received from the first communication unit by the second communication unit via the first logical line, and the second buffer area for storing the data having the second priority that is received from the first communication unit by the second communication unit via the second logical line; and a processing control unit configured to:

determine whether the second buffer area stores data;

read data from the second buffer area and control the data processing unit to process the data read from the second buffer area, in response to a determination result indicating that the second buffer area stores data; and determine whether the first buffer area stores data, in response to to a determination result indicating that the second buffer area does not store data, wherein the processing control unit is configured to transmit a reception waiting notification to the information processing apparatus via the first logical line before controlling the data processing unit to process the data read from the second buffer area;

wherein the transmission control unit is configured to stop transmission of the data via the first logical line in response to the reception waiting notification from the data processing apparatus;

wherein the processing control unit is configured to transmit a reception waiting cancel notification to the information processing apparatus via the first logical line on completion of the processing of the data read from the second buffer area; and wherein the transmission control unit is configured to restart transmission of the data via the first logical line in response to the reception waiting cancel notification.

6. A data processing apparatus, comprising:

a communication unit configured to communicate with an information processing apparatus via a single physical bus using at least two logical lines including a first logical line and a second logical line, the second logical line having a higher priority than the first logical line;

memory storing definition information that defines the at least two logical lines to generate at least two logical devices in the information processing apparatus in response to connecting the communication unit and the information processing apparatus, the at least two logical devices respectively corresponding to the at least two logical lines, wherein the definition information includes information that indicates a priority for each of the at least two logical lines, and the memory includes a first buffer area storing data that is received by the communication unit via the first logical line and a second buffer area storing data that is received by the communication unit via the second logical line; and a control unit configured to:

determine whether the information processing apparatus is connected to the communication unit via the physical bus;

transmit the definition information to the information processing apparatus via the communication unit in response to determining that the information processing apparatus is connected to the communication unit via the physical bus;

in response to reception of data via the communication unit using the first logical line, store the data in the first buffer area;

in response to reception of data via the communication unit using the second logical line, store the data in the second buffer area;

determine whether the second buffer area stores data;

determine whether the first buffer area stores data; and
process the data stored in the second buffer area prior to the data stored in the first buffer area in response to determining that the first buffer area and the second buffer area store data.

7. The data processing apparatus according to claim 6, wherein the single physical bus is a Universal Serial Bus (USB).

8. A non-transitory computer readable medium storing computer executable instructions that, when executed by at least one processor, cause an information processing apparatus to:
  receive a data processing command that is to be transmitted to a data processing apparatus that is in communication with a communication unit of the information processing apparatus via a single physical bus providing at least two logical lines including a first logical line and a second logical line having a higher priority than the first logical line;
  in response to receiving the data processing command, determine whether the received data processing command represents an instruction to process data according to a second priority higher than a first priority;
  designate one of at least two pieces of logical device information, including first logical device information and second logical device information, stored in memory of the information processing apparatus, the first logical device information being used to transmit data to the data processing apparatus via the first logical line, and the second logical device information being used to transmit data to the data processing apparatus via the second logical line;
  designate the second logical device information in response to determining that the received command represents the instruction to process data according to the second priority; and
  transmit the data to be processed according to the second priority from the communication unit to the data processing apparatus via the second logical line in response to designating the second logical device information.

9. The non-transitory computer readable medium according to claim 8, wherein the computer executable instructions, when executed by the at least one processor, further cause the information processing apparatus to:
  display, on a display of the information processing apparatus, an operation screen for selecting whether to process data according to the first priority or the second priority;
  determine that the data processing command represents an instruction to process the data according to the first priority after displaying the operation screen;
  in response to determining that the data processing command represents the instruction to process the data according to the first priority, select the first logical device information stored in the memory;
  determine that a second data processing command, received after selecting the first logical device information, represents an instruction to process second data according to the second priority; and
  in response to determining that the second data processing command represents the instruction to process the second data according to the second priority, select the second logical device information stored in the memory.

10. The non-transitory computer readable medium according to claim 8, wherein the computer executable instructions, when executed by the at least one processor, further cause the information processing apparatus to:
  designate the first logical device information; and
  in response to determining that the received data processing command represents the instruction to process the data according to the second priority when the first logical device information is designated, designate the second logical device information.

11. The non-transitory computer readable medium according to claim 8, wherein the computer executable instructions, when executed by the at least one processor, further cause the information processing apparatus to:
  in response to receiving the data processing command and in response to determining that the received data processing command represents the instruction to process the data according to the first priority, designate the first logical device information stored in the memory and transmit the data via the first logical line of the physical bus; and
  in response to receiving the data processing command and in response to determining that the received data processing command represents the instruction to process the data according to the second priority, designate the second logical device information stored in the memory and transmit the data via the second logical line of the physical bus.

12. The non-transitory computer readable medium according to claim 8, wherein the computer executable instructions, when executed by the at least one processor, further cause the information processing apparatus to:
  in response to receiving the data processing command and in response to determining that the received data processing command represents the instruction to process the data according to the first priority, compare priority information included in each of the first logical device information and the second logical device information;
  determine whether the priority information included in the designated logical device information has a higher priority than another piece of logical device information based on a result of the comparing;
  in response to determining that the priority information included in the designated logical device information has a higher priority than the another piece of logical device information, change the designated logical device information to the another piece of logical device information;
  in response to receiving the data processing command and in response to determining that the received data processing command represents the instruction to process data according to the second priority, compare priority information included in each of the first logical device information and the second logical device information; and
  in response to determining that the priority information included in the designated logical device information has a lower priority than the another piece of logical device information, change the designated logical device information to the another piece of logical device information.

13. The non-transitory computer readable medium according to claim 12, wherein the computer executable instructions, when executed by the at least one processor, further cause the information processing apparatus to:
  determine whether the communication unit is connected to the data processing apparatus via the single physical bus;
  in response to determining that the communication unit is connected to the data processing apparatus via the single physical bus, obtain definition information from the data processing apparatus, the definition information defining the at least two logical lines and indicating a priority for each of the at least two logical lines; and in response to obtaining the first logical device information and the second logical device information, store the first logical device information and the second logical device information in the memory of the information processing apparatus, the first logical device information including first priority information and the second logical device information including second priority information having a higher priority than the first priority information.

14. The non-transitory computer readable medium according to claim 13, wherein the single physical bus is a Universal Serial Bus (USB), and the definition information comprises a device descriptor that is defined according to a USB standard.

15. The non-transitory computer readable medium according to claim 14, wherein the priority information is an interface number that is defined according to the USB standard.

16. The non-transitory computer readable medium according to claim 8, wherein the computer executable instructions, when executed by the at least one processor, further cause the information processing apparatus to:

determine whether the communication unit is connected to the data processing apparatus via the single physical bus;

in response to determining that the communication unit is connected to the data processing apparatus via the single physical bus, obtain definition information from the data processing apparatus, the definition information defining the at least two logical lines and indicating a priority for each of the at least two logical lines; and in response to obtaining the first logical device information and the second logical device information, store the first logical device information and the second logical device information in the memory of the information processing apparatus, the first logical device information corresponding to the first logical line and the second logical device information corresponding to the second logical line that has a higher priority than the first logical line.

\* \* \* \* \*